US008157680B2

(12) United States Patent
Anderson

(10) Patent No.: US 8,157,680 B2
(45) Date of Patent: Apr. 17, 2012

(54) MOLDED ARCHERY ARROW FOR AN ARCHERY BOW WITH A METAL BARREL

(76) Inventor: Jeffrey R. Anderson, Wauconda, IL (US)

( * ) Notice: Subject to any disclaimer, the term of this patent is extended or adjusted under 35 U.S.C. 154(b) by 127 days.

(21) Appl. No.: 12/660,377

(22) Filed: Feb. 25, 2010

(65) Prior Publication Data

US 2011/0207563 A1   Aug. 25, 2011

(51) Int. Cl.
*F42B 6/04* (2006.01)
(52) U.S. Cl. ........................................................ 473/578
(58) Field of Classification Search .................. 473/578, 473/583, 584, 585, 586
See application file for complete search history.

(56) References Cited

U.S. PATENT DOCUMENTS

| | | | | |
|---|---|---|---|---|
| 4,829,974 A | | 5/1989 | Anderson | 124/24 R |
| 4,958,617 A | | 9/1990 | Anderson | 124/24.1 |
| 5,119,797 A | | 6/1992 | Anderson | 124/25 |
| 5,137,282 A | * | 8/1992 | Segar et al. | 473/583 |
| 5,263,465 A | | 11/1993 | Anderson | 124/24.1 |
| 5,443,273 A | * | 8/1995 | Lovorn | 473/586 |
| 6,142,133 A | * | 11/2000 | Anderson | 124/25.6 |
| 6,715,481 B1 | | 4/2004 | Anderson | 124/88 |
| 6,752,136 B1 | | 6/2004 | Anderson | 124/24.1 |
| 2009/0101126 A1 | | 4/2009 | Anderson | 124/25 |

* cited by examiner

*Primary Examiner* — John Ricci
(74) *Attorney, Agent, or Firm* — Rolland R Hackbart

(57) ABSTRACT

A novel molded archery arrow (100) includes a cylindrical steel shaft (101) with sharpened tip, a plastic ferrule (102) molded over the shaft (101), and cutting blades (103) serving as fletchings. The shaft (101) has a front end with a sharpened tip and a rear end with a stem, the stem having a smaller diameter than the front end of the shaft. The front end of shaft (101) includes indented rings (116) and the stem includes protruding rings (117) that affix shaft (101) to plastic ferrule (102) during the molding process. Since the ferrule (102) of arrow (100) is plastic, arrow (100) slides with little or no friction when launched from metal barrel (206) of a crossbow (200). In the molding process for arrow (100), an open space (115) is created by a tapered pin inserted into an arrow mold opposite the rear end of the stem of shaft (101). The tapered pin engages an indented portion of the stem and holds the shaft (101) in position in the mold while plastic material in liquid form (liquefied at high temperature) is pumped into the mold to form arrow (100). The mold also includes slots for positioning blades (103) so that holes (106) in blades (103) are inside the mold. Hot plastic is pumped into the mold through the tapered pin, coats the front end and stem of shaft (101) to create the ferrule (102) and extends through holes (106) in blades (103) to hold them in place.

12 Claims, 3 Drawing Sheets

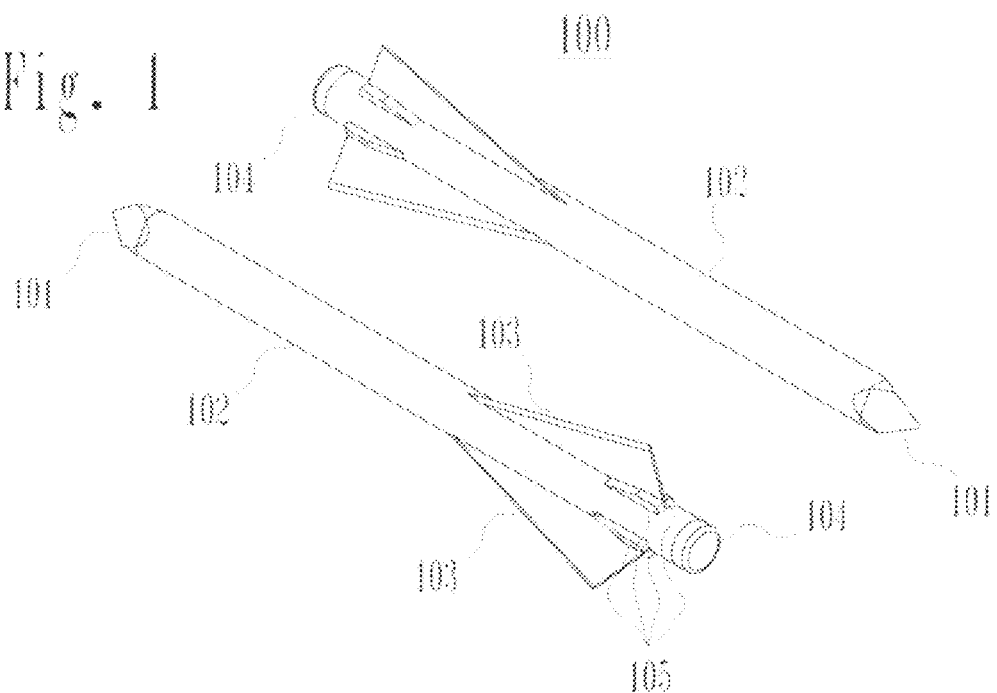
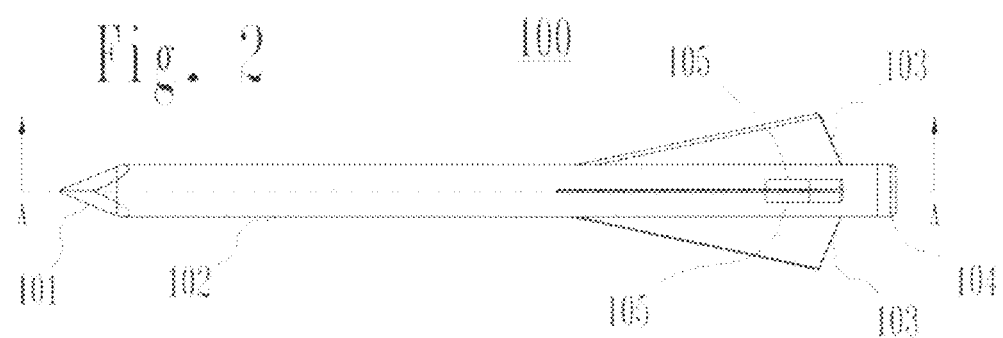
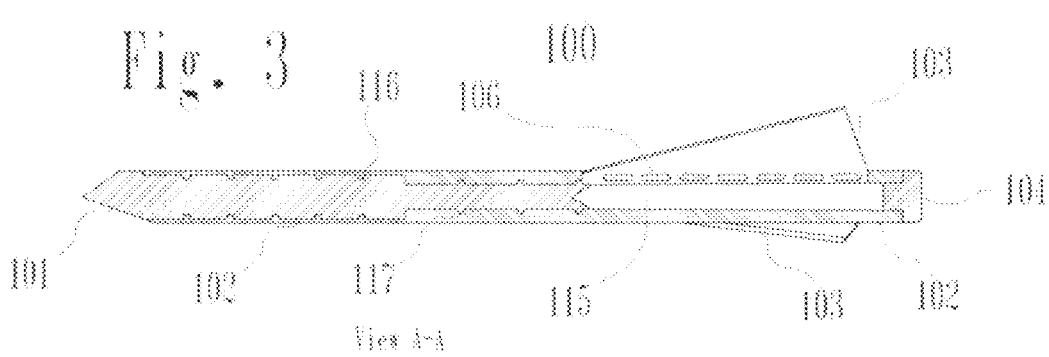

US 8,157,680 B2

MOLDED ARCHERY ARROW FOR AN ARCHERY BOW WITH A METAL BARREL

TECHNICAL FIELD

The present invention relates generally to the field of archery arrows, and more particularly to a molded archery arrow with cutting blades that serve as the fletchings and that can be launched from a crossbow with a metal barrel or a handheld archery bow with a metal barrel.

BACKGROUND

A prior art archery arrow with cutting blades serving as fletchings shown and described in my U.S. Pat. No. 4,958,617 includes a steel front portion with a pointed tip that screws onto an aluminum rear section having slots for the blades and a rear end for attaching a nock. Another prior art archery arrow with cutting blades serving as fletchings shown and described in my U.S. Pat. No. 5,119,797 includes a pointed, metal tip with a stem that fits into a socket of a nylon or plastic ferrule where the ferrule together with the blades is formed by injection molding. Both of the foregoing prior archery arrows use a two-piece construction rendering them more difficult and costly to make. Moreover, both of the prior art archery arrows have metal front portions that require that the metal barrel of the archery bow include nylon strips to avoid metal-on-metal contact between the metal stem of the arrow tip and the metal barrel when launched from the archery bow. Accordingly, there is a need for an improved and less costly archery arrow with cutting blades serving as the fletchings that can be injection molded as one-piece using a synthetic material such as plastic or glass filled nylon and that launched from a crossbow with a metal barrel or a handheld archery bow with a metal barrel.

BRIEF DESCRIPTION OF THE DRAWINGS

FIG. 2 is a top view of the 3-bladed molded archery arrow in FIG. 1, looking down on one of the three blades.

FIG. 3 is a section view of the 3-bladed molded archery arrow in FIG. 2, taken along lines A-A.

FIG. 4 is a left-side perspective view of the shaft and blades shown in the cross section view of the 3-bladed molded archery arrow in FIG. 3.

DETAILED DESCRIPTION OF THE DRAWINGS

Figure 1:
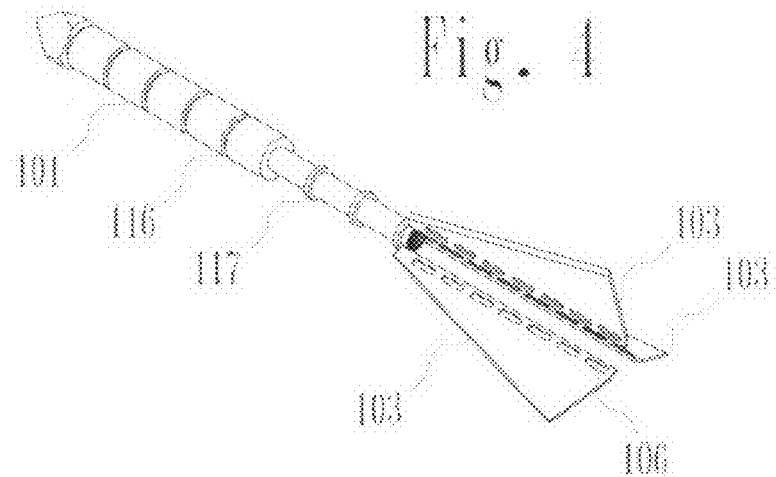
FIG. 1 is a right-side perspective view and left side perspective view of a molded archery arrow with three cutting blades serving as fletchings, illustrative of an embodiment of my invention.

An archery arrow illustrative of my invention that can be launched from an archery bow with a metal barrel comprises an arrow, comprising first and second blades, each having a sharpened outer edge and a an inner edge with at least two holes; a shaft having a front end with a tip and a rear end with a stem, the stem having of smaller diameter than the front end of the shaft; and a ferrule comprised of a synthetic material that is adapted to be molded over the front end and stem of the shaft, at least partially over the inner edge of the first and second blades, and through the holes in the first and second blades for retaining them. A method of molding an archery arrow illustrative of my invention that can be launched from an archery bow with a metal barrel, comprising: loading a mold with a shaft having a front end with a tip and a rear end having a stem, the stem having of smaller diameter than the shaft; loading the mold with first and second blades, each of the first and second blades having a sharpened outer edge and an inner edge with at least two holes that extend into the mold; inserting a pin in the mold opposite the rear end of the stem of the shaft; and injecting a synthetic material into the mold until the synthetic material flows over the front end and stem of the shaft, at least partially over the inner edge of the first and second blades, and through the holes in the inner edge of the first and second blades.

Referring now to FIGS. 1 through 4, there is illustrated a molded archery arrow 100 that includes a shaft 101 with sharpened tip, a ferrule 102 molded over the shaft 101, and three cutting blades 103 serving as fletchings. Shaft 101 may be comprised of steel or another metal material. Ferrule 102 may be comprised of plastic or another synthetic material that can be molded over shaft 101. Ferrule 102 also has plastic ridges 105 on each side of the rear end of blades 103 which keep each blade 103 substantially centered in a corresponding slot in metal barrel 206 of the crossbow in FIG. 7. Since the ferrule 102 of arrow 100 is plastic, arrow 100 slides with little or no friction when plastic arrow 100 is launched from metal barrel 206 of crossbow 200 in FIG. 7.

Referring to FIG. 3, there is illustrated a section view of the 3-bladed molded archery arrow 100 in FIG. 2, taken along lines A-A. The plastic ferrule 102 is molded over a cylindrical steel shaft 101 that has a front end with a sharpened tip and a rear end with a stem, the stem having a smaller diameter than the front end of the shaft. The front end of shaft 101 includes indented rings 116 (see FIG. 4) and the rear end includes protruding rings 117 that affix shaft 101 to plastic ferrule 102 during the molding process. Since the plastic ferrule 102 substantially covers the front end and stem of shaft 101, the plastic ferrule 102 engages the metal barrel 206 of crossbow 200 in FIG. 7 when launched thereby avoiding metal-on-metal contact between the metal shaft 101 and metal barrel 206. In the molding process for arrow 100, an open space 115 is created by a tapered pin inserted into an arrow mold (shaped to form arrow 100) opposite the rear end of the stem of shaft 101. The arrow mold also includes slots for positioning blades 103 such that holes 106 in blades 103 are inside the mold. The tapered pin is inserted into the arrow mold and engages an indented portion of the stem of shaft 101 to hold shaft 101 in position in the arrow mold. Plastic material in liquid form (liquefied at high temperature) is injected into the arrow mold (loaded with the shaft 101 and blades 103) through the tapered pin, coats shaft 101 to create ferrule 102, and extends through holes 106 in blades 103 to hold them in place. Next, the arrow mold is cooled to complete the process. Nock 104 can be added to arrow 100 after molding by means of glue or sonic welding.

Referring to FIG. 4, there is illustrated a left-side perspective view of the shaft 101 and blades 103 shown in the cross section view of the 3-bladed molded archery arrow 100 in FIG. 3. Shaft 101 includes rings 116 that extend inward and rings 117 that extend outward from the cylindrical shaft 101 to engage the plastic material injected during the molding process to create ferrule 102 (see FIG. 3). Blades 103 may be sharpened on one edge or both edges with more material being removed on the left edge of each blade 103 (or the right side edge in other embodiments) to spin arrow 100 during flight thereby making arrow 100 more accurate. Blades 103 include at least two holes 106 through which plastic material is injected during the molding process for holding blades 103 in place.

A novel process for molding the archery arrow 100 illustrative of my invention comprises: loading a mold with a shaft 101 having a front end with a tip and a rear end having a stem, the stem having of smaller diameter than the front end of the shaft 101; loading the mold with first and second blades 103, each of the first and second blades 103 having a sharpened outer edge and an inner edge with at least two holes 106 that extend into the mold; inserting a pin in the mold opposite the rear end of the stem of the shaft; and injecting a synthetic material into the mold until the synthetic material flows over the front end and stem of the shaft 101, at least partially over the inner edge of the first and second blades 103, and through the holes 106 in the inner edge of the first and second blades 103.

Figure 5:
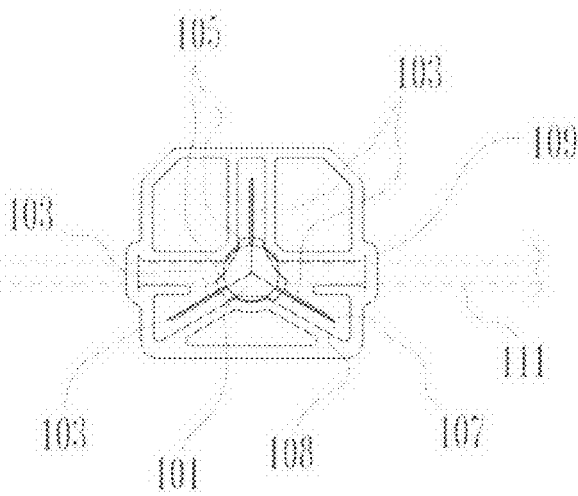
FIG. 5 is a front view of the muzzle end of the metal barrel of a crossbow loaded with the 3-bladed molded archery arrow in FIG. 1.
Figure 7:
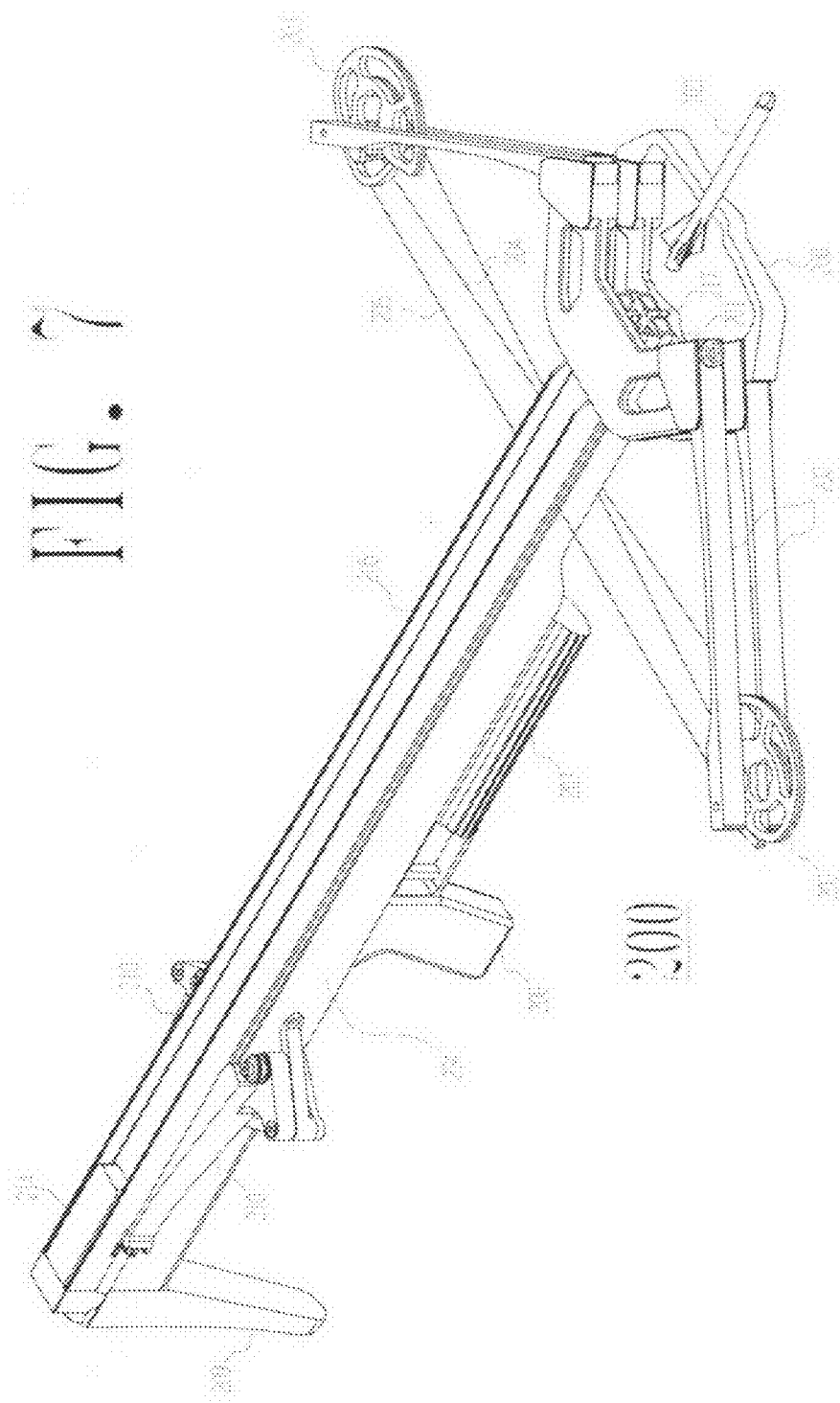
FIG. 7 is a perspective view of a crossbow where the string has been released and the 3-bladed molded archery arrow in FIG. 1 is being projected from the metal barrel of the crossbow.

Referring to FIG. 5, there is illustrated a front view of the muzzle end of the metal barrel 206 of the crossbow 200 in FIG. 7 loaded with the 3-bladed molded archery arrow 100 in FIG. 1. Each blade 103 had sharpened edges 107 and 108 with more material being removed on the left edge. The ferrule 102 of arrow 100 has plastic ridges 105 which keep each blade 103 substantially centered in a corresponding slot in metal barrel 206. The main bowstring 205 shown in dashed lines extends through the slot in barrel 206.

Figure 6:
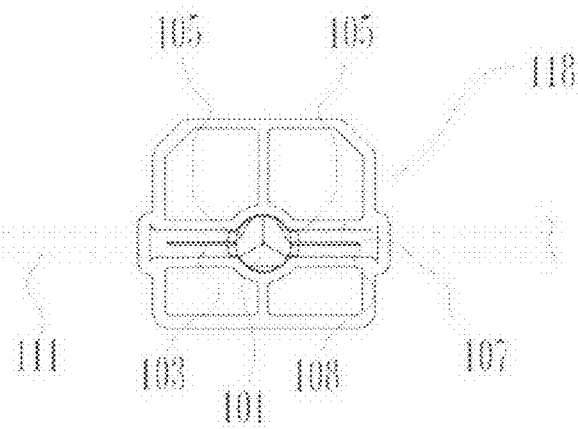
FIG. 6 is a front view of the muzzle'end of the metal barrel of another crossbow loaded with a molded two-blade embodiment of the archery arrow in FIG. 1.

Referring to FIG. 6, there is illustrated a front view of the muzzle end of a metal barrel 118 of an archery bow adapted to launch a molded two-blade embodiment of the archery arrow 100 in FIG. 1. The ferrule 102 of arrow 100 has plastic ridges 105 which keep each blade 103 substantially centered in a corresponding slot in metal barrel 118. Each blade 103 had sharpened edges 107 and 108 with more material being removed on the left edge. The main bowstring 111 shown in dashed lines extends through the slot in barrel 118.

Referring to FIG. 7, there is illustrated a right-side view of a crossbow 200 with an elongated draw length which is illustrated and described in my co-pending U.S. patent application Ser. No. 11/975,769, filed on Oct. 22, 2007 and entitled "Crossbow Having Elongated Draw Length" and incorporated herein in its entirety by reference. In FIG. 7, the string of crossbow 200 has been released and the 3-bladed molded archery arrow in FIG. 1 is being projected from the metal barrel 206 of crossbow 200. Crossbow 200 includes a riser 201, stirrup 200, first and second split limbs 202 each having a first end coupled to the riser 201, right and left eccentric cams 203 with axles attached to a second ends of first and second split limbs 202, main string 205 and harness 204 coupled to right and left eccentric cams 203, and a rifle-type stock 234 with a tubular barrel or arrow rest assembly 206 extending between a bore end and butt end of the stock 234. When used with molded archery arrow 100, tubular barrel 206 may be comprised of metal such as for example aluminum or steel. The bore end 217 of the stock 234 and the tubular barrel 206 are attached between the top portion and bottom portion of the riser 201. A forearm 207, a pistol grip 208 with trigger, and a shoulder rest 209 are also bolted or otherwise attached to the rifle-type stock 234. Two string compression levers 210 shown in the closed position are disposed on the stock 234 near the butt end of the stock 234. The tubular barrel 206 is comprised of an elongated track with a slot for the string 205 that extends from the bore end 217 to the butt end of the stock 234. A string release mechanism 214 is disposed in the barrel 206 near the butt end of the stock 234 and is coupled to the trigger disposed in grip 208. The string release mechanism 214 can be any conventional string release used in crossbows such as, for example, the string release mechanism illustrated and described in my U.S. Pat. No. 5,119,797. The tubular barrel 206 is similar to the arrow rest assembly illustrated and described in my U.S. Pat. Nos. 5,119,797, 6,142,133, 6,715,481 and 6,752,136, incorporated herein in their entirety by reference. Although illustrated in FIG. 7 with crossbow 200, the molded archery arrow 100 may also be used with a handheld bow similar to that illustrated and described in my U.S. Pat. Nos. 6,142,133, 6,715,481 and 6,752,136 where the arrow rest assembly is a metal barrel.

While particular embodiments of my invention have been shown and described, modifications may be made. It is therefore intended in the appended claims to cover all such changes and modifications which fall within the true spirit and scope of my invention.

What is claimed is:

1. An arrow that can be launched from an archery bow with a metal barrel, comprising:
    first and second blades, each having a sharpened outer edge and a an inner edge with at least two holes;
    a shaft having a front end with a tip and a rear end with a stem, the stem having of smaller diameter than the front end of the shaft; and
    a ferrule comprised of a synthetic material that is adapted to be molded over the front end and stem of the shaft, at least partially over the inner edge of the first and second blades, and through the holes in the first and second blades for retaining them.

2. The arrow according to claim 1, wherein each of the first and second blades is comprised of stainless steel.

3. The arrow according to claim 1, further including a nock attached at a rear end of the ferrule.

4. The arrow according to claim 1, wherein the first and second blades each have a first side that is sharpened and a second side that is flat.

5. The arrow according to claim 1, wherein the first and second blades each have a first side that is sharpened and a second side that is sharpened.

6. The arrow according to claim 1, wherein the ferrule is plastic and has a plastic ridge on each side of each of the first and second blades.

7. An arrow that can be launched from an archery bow with a metal barrel, comprising:
    first and second blades, each having a sharpened outer edge and a an inner edge with at least two holes;
    a shaft having a front end with a tip and a rear end having a stem, the stem having of smaller diameter than the front end of the shaft; and
    a ferrule comprised of plastic that is adapted to be molded over the front end and stem of the shaft, at least partially over the inner edge of the first and second blades, and through the holes in the first and second blades for retaining them, whereby the plastic ferrule engages the metal barrel when launched from the archery bow.

8. The arrow according to claim 7, wherein each of the first and second blades is comprised of stainless steel.

9. The arrow according to claim 7, further including a nock attached at a rear end of the ferrule.

10. The arrow according to claim 7, wherein the first and second blades each have a first side that is sharpened and a second side that is flat.

11. The arrow according to claim 7, wherein the first and second blades each have a first side that is sharpened and a second side that is sharpened.

12. The arrow according to claim 7, wherein the ferrule has a plastic ridge on each side of each of the first and second blades.

* * * * *